(12) United States Patent
Yang et al.

(10) Patent No.: US 11,762,164 B2
(45) Date of Patent: *Sep. 19, 2023

(54) LENS AND LENS ASSEMBLY INCLUDING THE SAME

(71) Applicant: Samsung Electro-Mechanics Co., Ltd., Suwon-si (KR)

(72) Inventors: Dong Shin Yang, Suwon-si (KR); Ju Sung Park, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 188 days.

This patent is subject to a terminal disclaimer.

(21) Appl. No.: 17/132,620

(22) Filed: Dec. 23, 2020

(65) Prior Publication Data

US 2021/0116667 A1  Apr. 22, 2021

Related U.S. Application Data

(63) Continuation of application No. 16/278,776, filed on Feb. 19, 2019, now Pat. No. 10,908,378.

(30) Foreign Application Priority Data

Sep. 28, 2018 (KR) .......................... 10-2018-0116201

(51) Int. Cl.
*G02B 7/00* (2021.01)
*G02B 27/00* (2006.01)
*G02B 7/02* (2021.01)

(52) U.S. Cl.
CPC ............ *G02B 7/003* (2013.01); *G02B 7/021* (2013.01); *G02B 27/0018* (2013.01)

(58) Field of Classification Search
CPC ...... G02B 7/003; G02B 7/021; G02B 27/0018
(Continued)

(56) References Cited

U.S. PATENT DOCUMENTS

2006/0250931 A1  11/2006  Togashi et al.
2009/0168204 A1   7/2009  Nishizawa et al.
(Continued)

FOREIGN PATENT DOCUMENTS

CN    101932956 A   12/2010
CN    105190390 A   12/2015
(Continued)

OTHER PUBLICATIONS

Chinese Office Action dated Mar. 25, 2022, in counterpart Chinese Patent Application No. 201910480589.2 (8 pages in English and 8 pages in Chinese).
(Continued)

*Primary Examiner* — William Choi
(74) *Attorney, Agent, or Firm* — NSIP Law

(57) ABSTRACT

A lens includes an optical portion refracting light, a rib extending along a circumference of at least a portion of the optical portion, a first area and a second area of an object-side surface of the rib, wherein the first area has a first surface roughness and the second area has a second surface roughness less rough than the first surface roughness, and a third area and a fourth area of an image-side surface of the rib, wherein the third area has a third surface roughness and the fourth area has a fourth surface roughness less rough than the third surface roughness, wherein the second area includes inclined surfaces.

19 Claims, 5 Drawing Sheets

(58) Field of Classification Search
USPC .......................................................... 359/819
See application file for complete search history.

(56) References Cited

U.S. PATENT DOCUMENTS

| | | |
|---|---|---|
| 2010/0040821 A1 | 2/2010 | Shyu et al. |
| 2011/0085070 A1 | 4/2011 | Kang et al. |
| 2016/0011415 A1 | 1/2016 | Takada |
| 2017/0176649 A1 | 6/2017 | Chang |

FOREIGN PATENT DOCUMENTS

| | | |
|---|---|---|
| CN | 205333947 U | 6/2016 |
| CN | 108174066 A | 6/2018 |
| CN | 207528981 U | 6/2018 |
| JP | 63-316001 A | 12/1988 |
| KR | 10-1060915 B1 | 8/2011 |
| KR | 10-2014-0067451 A | 6/2014 |
| WO | WO 2015/137026 A1 | 9/2015 |

OTHER PUBLICATIONS

Chinese Office Action dated Nov. 18, 2021, in counterpart Chinese Patent Application No. 201910480589.2 (9 pages in English and 8 pages in Chinese).
Chinese Office Action dated Jun. 2, 2021, in Counterpart Chinese Patent Application No. 201910480589.2 (8 pages in English and 7 pages in Chinese).

LENS AND LENS ASSEMBLY INCLUDING THE SAME

CROSS-REFERENCE TO RELATED APPLICATIONS

This application is a continuation of U.S. patent application Ser. No. 16/278,776 filed on Feb. 19, 2019, now U.S. Pat. No. 10,908,378 issued on Feb. 2, 2021, which claims the benefit under 35 USC 119(a) of Korean Patent Application No. 10-2018-0116201 filed on Sep. 28, 2018, in the Korean Intellectual Property Office, the entire disclosures of which are incorporated herein by reference for all purposes.

BACKGROUND

1. Field

This application relates to a lens and a lens assembly including the same.

2. Description of the Background

Camera modules have been recently used in portable electronic devices such as smartphones.

Such camera modules include a lens assembly including a plurality of lenses. Recently, the number of lenses has been increased in order to improve performance of the camera modules and the camera modules have decreased in size.

That is, the size of camera modules has decreased, while the number of lenses has increased. As a result, it has become more difficult to align optical axes of the plurality of lenses with each other.

Further, there may be a problem in that unintended light reflection may occur in the camera module, and the unintendedly reflected light, light irrelevant to image formation, may cause a flare or ghost phenomenon in a photographed image.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens includes an optical portion refracting light, a rib extending along a circumference of at least a portion of the optical portion, a first area and a second area of an object-side surface of the rib, wherein the first area has a first surface roughness and the second area has a second surface roughness less rough than the first surface roughness, and a third area and a fourth area of an image-side surface of the rib, wherein the third area has a third surface roughness and the fourth area has a fourth surface roughness less rough than the third surface roughness, wherein the second area includes inclined surfaces.

At least portions of the second area and the fourth area may overlap each other when viewed in an optical axis direction.

The inclined surfaces may include different angles of inclination from each other.

The inclined surfaces may meet at a first edge portion.

A second edge portion may be formed in the fourth area.

The first edge portion and the second edge portion may be disposed in a region in which the second area and the fourth area overlap each other when viewed in the optical axis direction.

A length between the first edge portion and an end of the rib may be different from a length between the second edge portion and the end of the rib.

The first area and the second area may be alternately formed from one side end of the rib to the other side end of the rib.

The first area may be disposed on each of both sides of the second area.

The lens may further include a first protrusion disposed in the first area protruding in the optical axis direction and a second protrusion disposed in the third area protruding opposite to the first protrusion in the optical axis direction.

An end of the rib may have a surface roughness corresponding to that of the first area, the second area, the third area, or the fourth area.

In another general aspect, a lens assembly includes lenses disposed along an optical axis and each of the lenses including an optical portion refracting light and a rib extending along a circumference of at least a portion of the optical portion, and a lens barrel in which the lenses are accommodated, wherein an object-side surface of the rib of at least one of the lenses includes a first area and a second area having different surface roughnesses, wherein the first area is disposed to be closer to the optical portion than the second area and is rougher than the second area, and wherein the second area includes inclined surfaces.

An image-side surface of the rib of the at least one lens may include a third area and a fourth area having different surface roughnesses. The third area may be disposed to be closer to the optical portion than the fourth area and may be rougher than the fourth area.

At least portions of the second area and the fourth area may overlap each other when viewed in an optical axis direction.

The second area and the fourth area each may include an edge portion, and the edge portion may be disposed in a region in which the second area and the fourth area overlap each other in the optical axis direction.

The ribs of two adjacent lenses may be coupled to one another.

A spacer may be disposed between the ribs of the two adjacent lenses coupled to one another.

In another general aspect, a lens includes an object-side surface and an image-side surface, an optical portion having an optical axis, and a rib extending along a circumference of the optical portion, the rib including a first circumferential region and a second circumferential region having lower surface roughness than the first circumferential region on the object-side and the image-side surfaces, wherein the second circumferential region overlaps on the object-side and the image-side surfaces in an optical axis direction in proportion to concentricity of the of the object-side surface and the image-side surface.

The second circumferential region may include a circumferential edge portion.

The second circumferential region may include a first circumferential edge portion disposed on the object-side and a second circumferential edge portion disposed on the image-side, wherein the first circumferential edge portion may be spaced apart from the second circumferential edge portion in a direction perpendicular to the optical axis direction in proportion to concentricity of the object-side surface and the image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
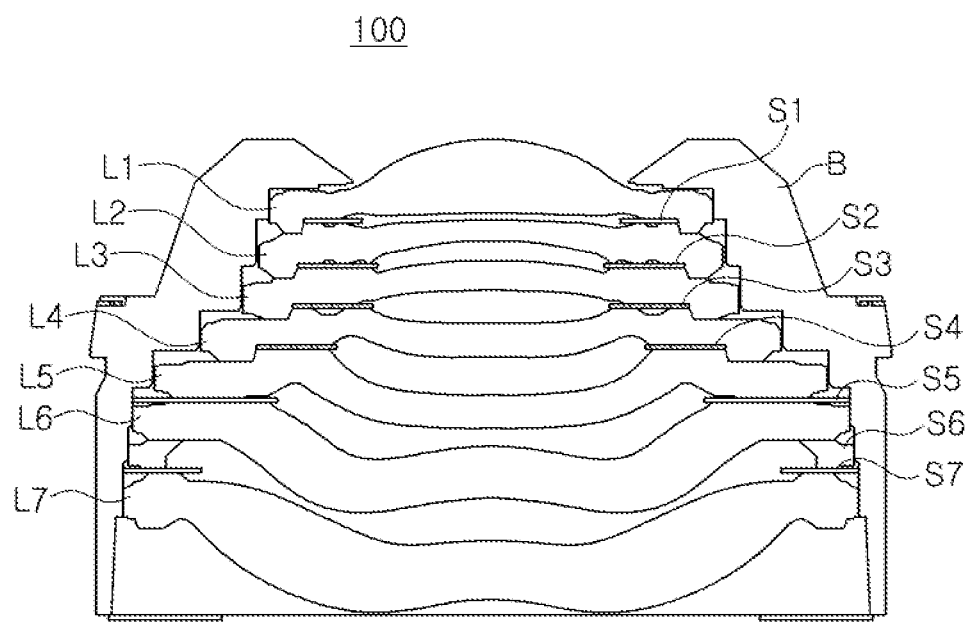
FIG. 1 is a schematic cross-sectional view of a lens assembly according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

An aspect of the present disclosure may provide a lens and a lens assembly including the same, capable of preventing light reflection from occurring and enabling easy measurement of concentricity of the lens.

Figure 2:
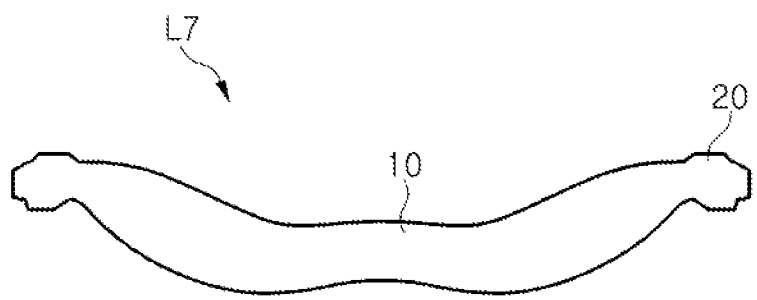
FIG. 2 is a schematic cross-sectional view of a lens according to one or more examples.

FIG. 1 is a schematic cross-sectional view of a lens assembly according to one or more examples and FIG. 2 is a schematic cross-sectional view of a lens according to one or more examples.

Referring to FIG. 1, a lens assembly 100 in the examples described herein may include a plurality of lenses arranged along an optical axis. Further, the lens assembly 100 may further include a lens barrel B in which the plurality of lenses are accommodated. The plurality of lenses may be arranged to be spaced apart from one another by preset distances along the optical axis.

The plurality of lenses may include five or more lenses. For example, the plurality of lenses according to the present example may include a first lens L1, a second lens L2, a third lens L3, a fourth lens L4, a fifth lens L5, a sixth lens L6, and a seventh lens L7 arranged to face upward from an object side along the optical axis.

The first lens L1 may refer to a lens closest to an object (or a subject), while the seventh lens L7 may refer to a lens closest to an image sensor.

However, embodiments of the present disclosure are not limited by the number of lenses.

Each lens may include an optical portion 10 and a rib 20 (FIG. 2).

The optical portion 10 may be a part for optical performance of the lens. For example, light reflected from the object (or subject) may be refracted while passing through the optical portion 10.

The rib 20 may be a component for fixing the lens to another component, for example, the lens barrel B or another lens. The rib 20 may extend at a circumference of at least a portion of the optical portion 10, and may be formed integrally with the optical portion 10.

The lens assembly 100 may include a self-aligning structure. That is, the lens assembly 100 may include a structure in which at least some of the plurality of lenses are coupled to one another so that optical axes thereof are aligned with each other.

For example, the optical axes may be aligned with each other by coupling five lenses to one another as illustrated in FIG. 1.

Here, the first lens L1 disposed to be closest to the object side may be in contact with the lens barrel B to align an optical axis thereof, and the second to fifth lenses L2 to L5 may be coupled to other lenses adjacent to the object side (for example, the first to fourth lenses L1 to L4), respectively, to align optical axes thereof with each other.

For example, the first lens L1 and the second lens L2 may be coupled to each other, the second lens L2 and the third lens L3 may be coupled to each other, the third lens L3 and the fourth lens L4 may be coupled to each other, and the fourth lens L4 and the fifth lens L5 may be coupled to each other.

That is, the ribs 20 of the first to fifth lenses L1 to L5 may be coupled to one another so that the optical axes of the respective lenses are aligned with each other. The rib 20 of each lens may include a rugged structure, and rugged structures of the adjacent lenses may be coupled to one another to align the optical axes of the lenses with each other.

Alternatively, all lenses of the lens assembly 100 may be coupled to one another to align optical axes thereof with each other, more than five lenses may be coupled to one another to align optical axes thereof with each other, or less than five lenses may be coupled to one another to align optical axes thereof with each other.

Spacers may each be provided between lenses adjacent to each other. At least a portion of the rib 20 of each lens may be in contact with the spacer. The spacer may maintain an interval between the lenses, and block unnecessary light.

The spacers may include a first spacer S1, a second spacer S2, a third spacer S3, a fourth spacer S4, a fifth spacer S5, a sixth spacer S6, and a seventh spacer S7 arranged toward the image sensor from the object side.

The first spacer S1 may be disposed between the first lens L1 and the second lens L2, the second spacer S2 may be disposed between the second lens L2 and the third lens L3, the third spacer S3 may be disposed between the third lens L3 and the fourth lens L4, the fourth spacer S4 may be disposed between the fourth lens L4 and the fifth lens L5, the fifth spacer S5 may be disposed between the fifth lens L5 and the sixth lens L6, and the sixth spacer S6 may be disposed between the sixth lens L6 and the seventh lens L7. The seventh spacer S7 may also be disposed between the sixth lens L6 and the seventh lens L7.

The sixth spacer S6 may be formed to have the largest thickness among the plurality of spacers. For example, a thickness of the sixth spacer S6 in an optical axis direction may be larger than those of other spacers in the optical axis direction.

Figure 3:
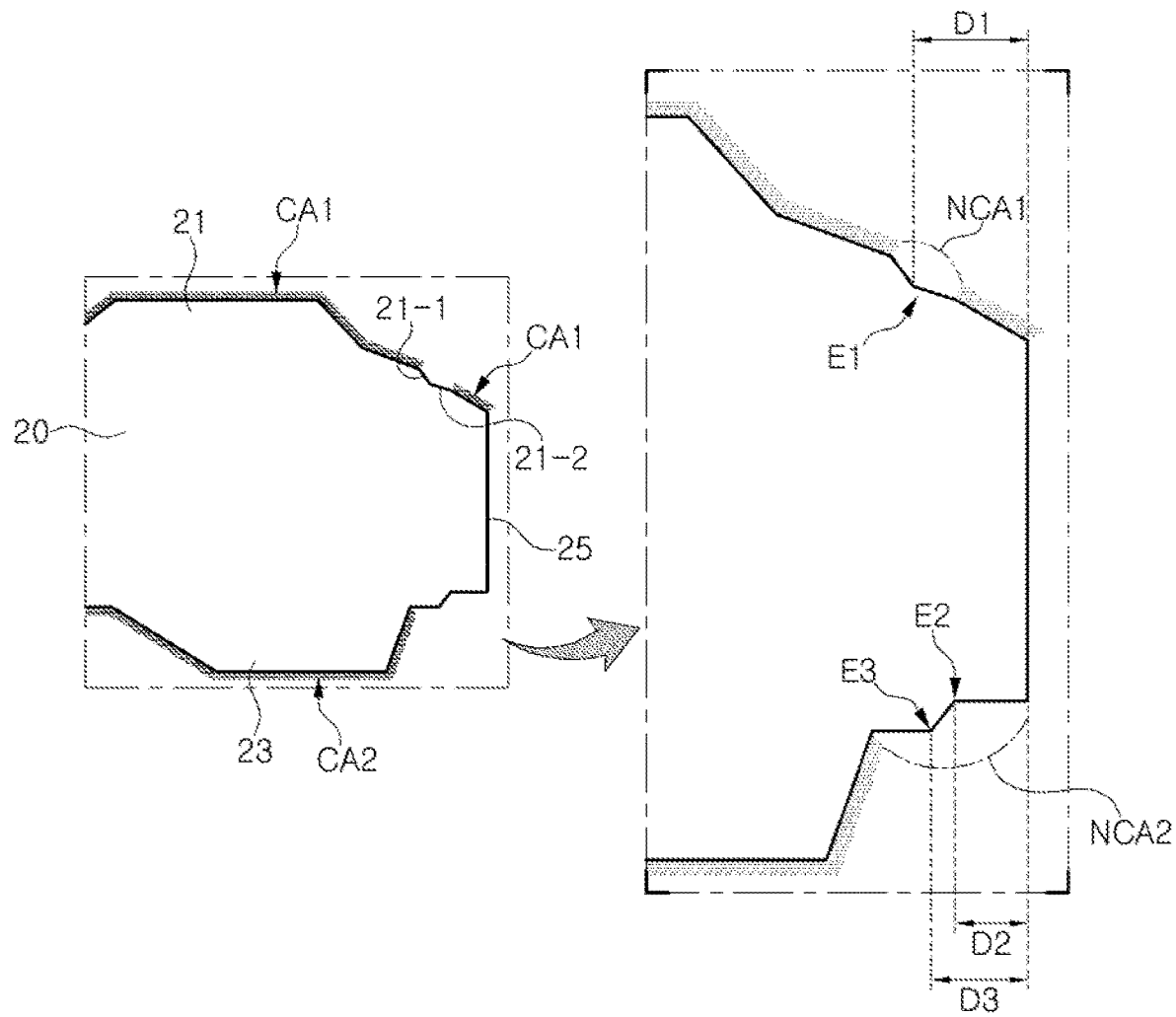
FIG. 3 is an enlarged cross-sectional view of a portion of a rib of a lens according to one or more examples.

FIG. 3 is an enlarged cross-sectional view of a portion of a rib of a lens according to one or more examples.

The lens in the examples described herein may be formed of a plastic material and may be injection-molded by injecting a resin material into a mold.

The lens may include an object-side surface (a surface facing the object side) and an image-side surface (a surface facing the image sensor). When the center of the object-side surface and the center of the image-side surface do not coincide with each other, it is difficult to align the optical axis with an optical axis of another lens, and image quality of a photographed image deteriorates. Therefore, there is a need to precisely measure concentricity of the object-side surface and the image-side surface of the injection-molded lens.

Meanwhile, light reflected from the object (or subject) is refracted while passing through the lens. In this case, unintended light reflection may occur. The unintendedly reflected light which is light irrelevant to image formation may cause a flare phenomenon in the photographed image.

The lens in the examples described herein may suppress the flare phenomenon from occurring even when the unintended light reflection occurs, and enable easy measurement of concentricity of the object-side surface and the image-side surface.

The object-side surface of the rib 20 of the lens in the examples described herein may include a first area CA1 having first surface roughness and a second area NCA1 having second surface roughness.

The image-side surface of the rib 20 of the lens in the examples described herein may include a third area CA2 having third surface roughness and a fourth area NCA2 having fourth surface roughness.

The surface roughness of the first area CA1 may be different from that of the second area NCA1, and the surface roughness of the third area CA2 may be different from that of the fourth area NCA2.

As an example, the first area CA1 may be rougher than the second area NCA1 and the third area CA2 may be rougher than the fourth area NCA2.

The first area CA1 and the third area CA2 may have surface roughnesses corresponding to each other and the second area NCA1 and the fourth area NCA2 may have surface roughnesses corresponding to each other.

The first and third areas CA1 and CA2 may be corroded areas and may be formed by chemical etching or physical polishing. Therefore, the first and third areas CA1 and CA2 may diffuse reflected light.

Accordingly, even when unintended light reflection occurs, the reflected light may not be concentrated on a point, thereby suppressing occurrence of the flare phenomenon.

The second area NCA1 and the fourth area NCA2 may not be surface-treated, or even in the case in which the second area NCA1 and the fourth area NCA2 are surface-treated, the surface roughnesses of the second and fourth areas NCA1 and NCA2 may be different from those of the first and third areas CA1 and CA2. As an example, the second and fourth areas NCA1 and NCA2 may have lower surface roughnesses (i.e., be less rough, be smoother) than the first and third areas CA1 and CA2.

The first area CA1 and the second area NCA1 may be alternately formed on the object-side surface of the rib 20 of the lens.

As an example, the first area CA1, the second area NCA1, and the first area CA1 may be sequentially formed from one side end (a portion in contact with the optical portion 10) of the object-side surface of the rib 20 of the lens to the other side end (a portion in contact with an outermost side surface 25 of the lens) of the object-side surface of the rib 20 of the lens. That is, the first area CA1 may be disposed on each of both sides of the second area NCA1.

One of the first areas CA1 may be disposed to be closer to the optical portion 10 than the second area NCA1.

A protrusion 21 may be provided on the object-side surface of the rib 20 of the lens, and the first area CA1 may be continuously formed in a region including the protrusion 21 from the one side end of the object-side surface of the rib 20 of the lens.

In addition, the first area CA1 may also be formed in a portion where the object-side surface of the lens is in contact with the outermost side surface 25 of the lens.

An area of the first area CA1 may be larger than that of the second area NCA1 on the object-side surface of the rib 20 of the lens.

The second area NCA1 formed between the first areas CA1 may include a plurality of inclined surfaces 21-1 and 21-2 having different angles of inclination. A first edge portion E1 may be formed at a portion where the plurality of inclined surfaces 21-1 and 21-2 meet each other.

The third area CA2 and the fourth area NCA2 may be alternately formed on the image-side surface of the rib 20 of the lens. As an example, the third area CA2 and the fourth area NCA2 may be sequentially formed from one side end (a portion in contact with the optical portion 10) of the image-side surface of the rib 20 of the lens to the other side end (a portion in contact with the outermost side surface 25 of the lens) of the image-side surface of the rib 20 of the lens.

The third area CA2 may be disposed to be closer to the optical portion 10 than the fourth area NCA2.

A protrusion 23 may be provided on the image-side surface of the rib 20 of the lens, and the third area CA2 may be continuously formed in a region including the protrusion 23 from the one side end of the image-side surface of the rib 20 of the lens.

An area of the third area CA2 may be larger than that of the fourth area NCA2 on the image-side surface of the rib 20 of the lens.

The fourth area NCA2 may include a second edge portion E2. Alternatively, the fourth area NCA2 may include the second edge portion E2 and a third edge portion E3. The second and third edge portions E2 and E3 may also mean a portion where inclined surfaces having different angles of inclination meet each other. Alternatively, the second and third edge portions E2 and E3 may mean a portion where an inclined surface and a horizontal surface (a surface perpendicular to the optical axis) meet each other.

Here, at least portions of the second area NCA1 and the fourth area NCA2 may overlap each other when viewed in the optical axis direction.

In addition, the first edge portion E1 and the second edge portion E2 (and/or the third edge portion E3) may be disposed in the overlapped region.

A length D1 (a shortest distance in a direction perpendicular to the optical axis) between the outermost surface 25 (the end of the rib 20) of the lens and the first edge portion E1 and a length D2 (and/or D3) (a shortest distance in the direction perpendicular to the optical axis) between the outermost surface 25 (the end of the rib 20) of the lens and the second edge portion E2 (and/or the third edge portion E3) may be different from each other.

As an example, the length D1 between the outermost surface 25 of the lens and the first edge portion E1 may be larger than the length D2 (and/or D3) between the outermost surface 25 of the lens and the second edge portion E2 (and/or the third edge portion E3).

The first edge portion E1 and the second edge portion E2 (and/or the third edge portion E3) may be disposed in a region in which the second area NCA1 and the fourth area NCA2 overlap each other in the optical axis direction, thereby easily measuring concentricity of the lens.

Meanwhile, in the present example, the outermost surface 25 of the lens may have a surface roughness corresponding to that of the second area NCA1 or the fourth area NCA2.

At least one of the plurality of lenses provided in the lens assembly 100 in the examples described herein may be a lens described with reference to FIG. 3. As an example, the lens described with reference to FIG. 3 may be a lens disposed to be closest to the image sensor among the plurality of lenses.

Figure 4:
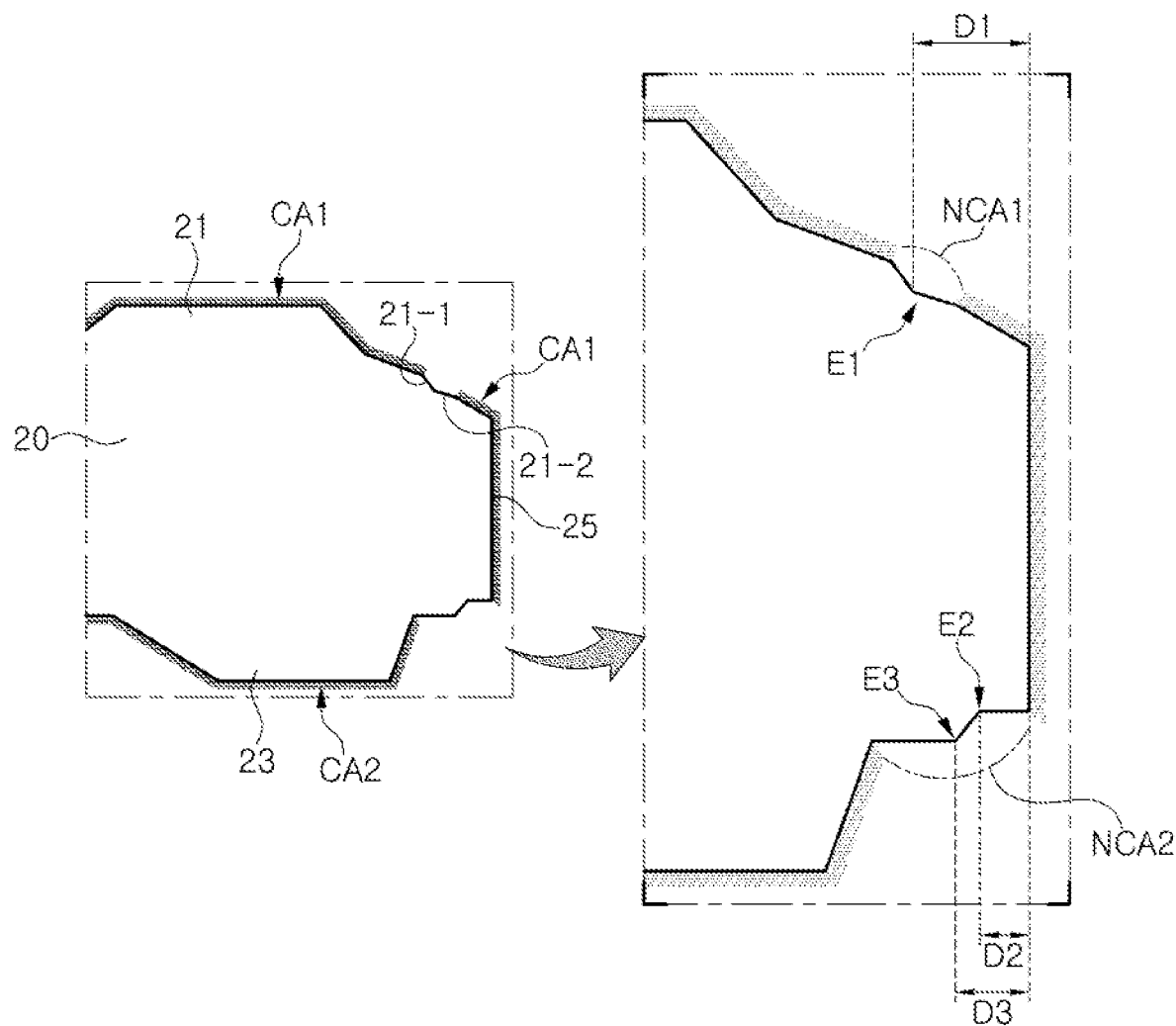
FIGS. 4 and 5 are enlarged cross-sectional views of portions of ribs of lenses according to one or more other examples.
Figure 5:
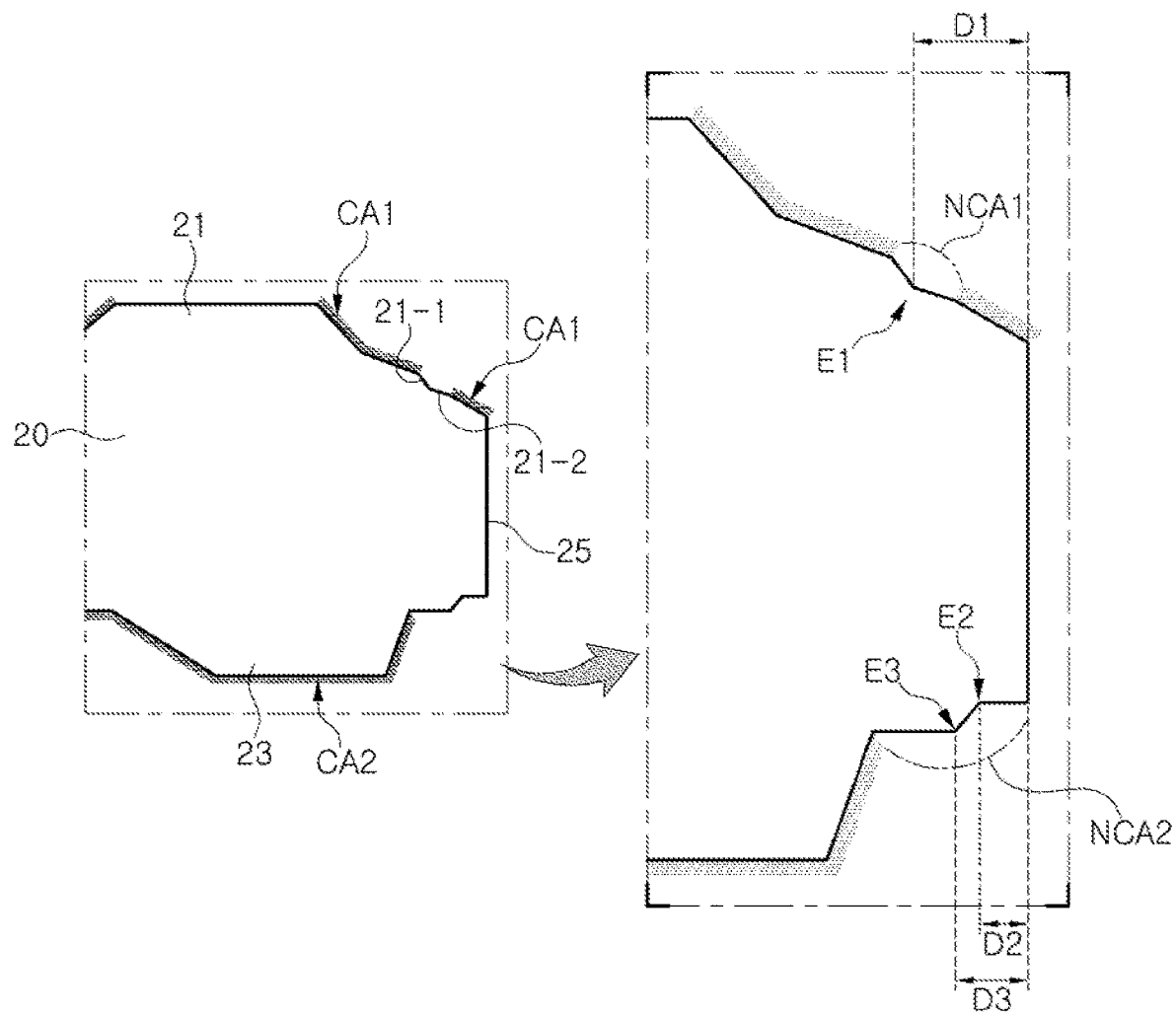

FIGS. 4 and 5 are enlarged cross-sectional views of portions of ribs of lenses according to one or more other examples described herein.

The example of FIG. 4 is the same as the example of FIG. 3, except for the outermost surface 25 of the lens, and the outermost surface 25 of the lens in the example of FIG. 4 may have a surface roughness corresponding to that of the first area CA1 or the third area CA2.

The example of FIG. 5 is the same as the example of FIG. 3, except for the protrusion 21 of the object-side surface of the rib 20 of the lens, and a surface of the protrusion 21 of the object-side surface of the rib 20 of the lens, which is closest to the object side may have a surface roughness corresponding to that of the second area NCA1 or the fourth area NCA2. The surface closest to the object side may be a surface in direct contact with another component (for example, the spacer or another lens).

Figure 6:
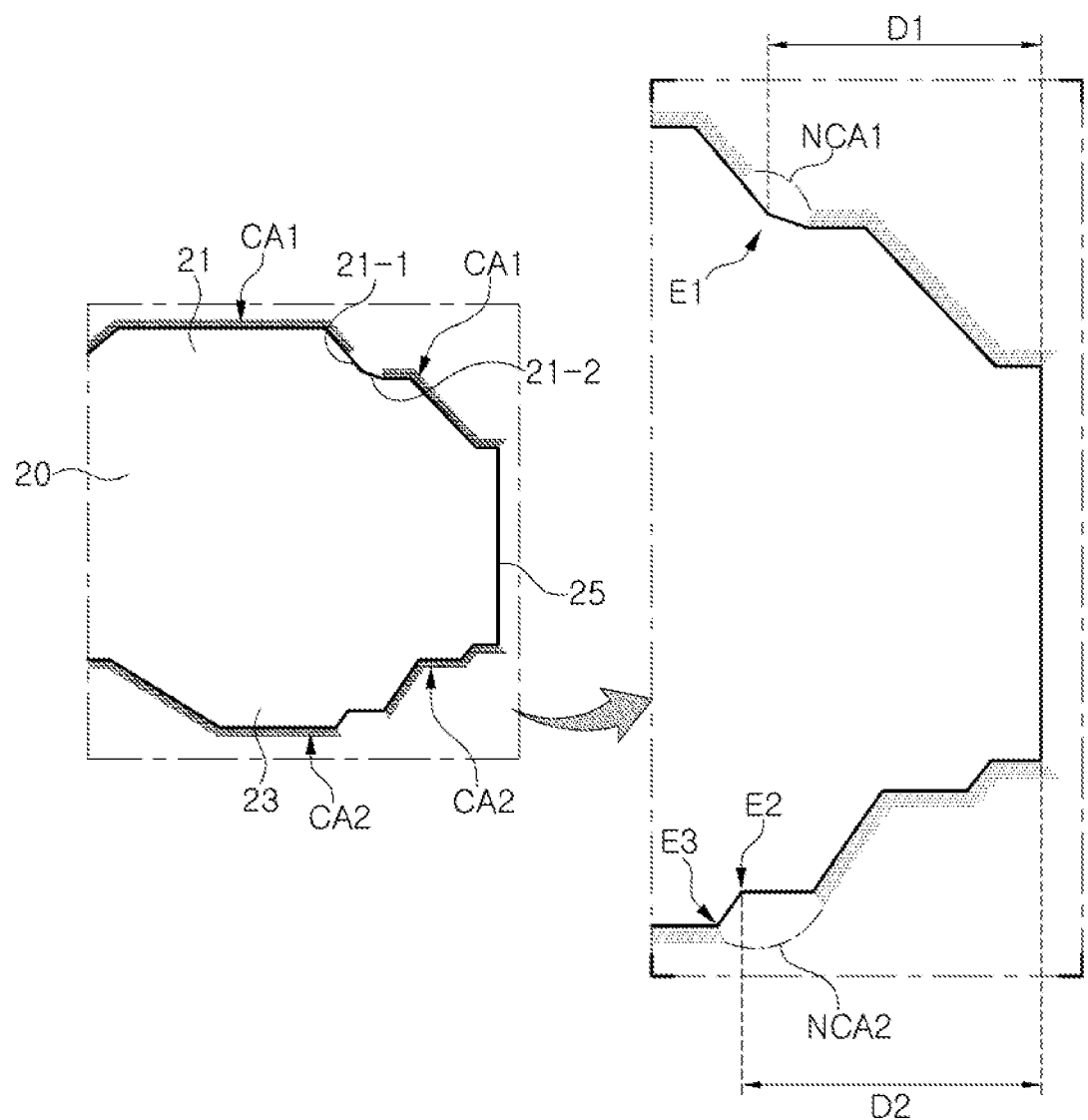
FIG. 6 is an enlarged cross-sectional view of a portion of a rib of a lens according to one or more still other examples.

FIG. 6 is an enlarged cross-sectional view of a portion of a rib of a lens according to another example in the examples described herein.

A first area CA1 and a second area NCA1 may be alternately formed on an object-side surface of a rib 20 of a lens. As an example, the first area CA1, the second area NCA1, and the first area CA1 may be sequentially formed from one side end (a portion in contact with an optical portion 10) of the object-side surface of the rib 20 of the lens to the other side end (a portion in contact with an outermost side surface 25 of the lens) of the object-side surface of the rib 20 of the lens. That is, the first area CA1 may be disposed on each of both sides of the second area NCA1.

One of the first areas CA1 may be disposed to be closer to the optical portion 10 than the second area NCA1.

A protrusion 21 may be provided on the object-side surface of the rib 20 of the lens, and the first area CA1 may be continuously formed in a region including the protrusion 21 from the one side end of the object-side surface of the rib 20 of the lens.

In addition, the first area CA1 may also be formed in a portion where the object-side surface of the lens is in contact with the outermost side surface 25 of the lens.

An area of the first area CA1 may be larger than that of the second area NCA1 on the object-side surface of the rib 20 of the lens.

The second area NCA1 formed between the first areas CA1 on the object-side surface may include a plurality of inclined surfaces 21-1 and 21-2 having different angles of inclination. A first edge portion E1 may be formed at a portion where the plurality of inclined surfaces 21-1 and 21-2 meet each other.

A third area CA2 and a fourth area NCA2 may be alternately formed on an image-side surface of the rib 20 of the lens. As an example, the third area CA2, the fourth area NCA2, and the third area CA2 may be sequentially formed from one side end (a portion in contact with the optical portion 10) of the image-side surface of the rib 20 of the lens to the other side end (a portion in contact with the outermost side surface 25 of the lens) of the image-side surface of the rib 20 of the lens. That is, the third areas CA2 may be disposed at both sides of the fourth area NCA2.

One of the third areas CA2 may be disposed to be closer to the optical portion 10 than the fourth area NCA2.

A protrusion 23 may be provided on the image-side surface of the rib 20 of the lens, and the third area CA2 may be continuously formed in a region including the protrusion 23 from the one side end of the image-side surface of the rib 20 of the lens.

In addition, the third area CA2 may also be formed in a portion where the image-side surface of the lens is in contact with the outermost side surface 25 of the lens.

An area of the third area CA2 may be larger than that of the fourth area NCA2 on the image-side surface of the rib 20 of the lens.

The fourth area NCA2 formed between the third areas CA2 on the image-side surface may include a second edge portion E2. The second edge portion E2 may also mean a portion where inclined surfaces having different angles of inclination meet each other. Alternatively, the second edge portion E2 may mean a portion where an inclined surface and a horizontal surface (a surface perpendicular to the optical axis) meet each other.

Here, at least portions of the second area NCA1 formed on the object-side surface of the lens and the fourth area NCA2 formed on the image-side surface of the lens may overlap each other when viewed in the optical axis direction.

In addition, the first edge portion E1 and the second edge portion E2 may be disposed in the overlapped region.

A length D1 (a shortest distance in a direction perpendicular to the optical axis) between the outermost surface 25 of the lens and the first edge portion E1 and a length D2 (a shortest distance in the direction perpendicular to the optical axis) between the outermost surface 25 of the lens and the second edge portion E2 may be different from each other.

As an example, the length D1 between the outermost surface 25 of the lens and the first edge portion E1 may be smaller than the length D2 between the outermost surface 25 of the lens and the second edge portion E2.

The first edge portion E1 and the second edge portion E2 may be disposed in a region in which the second area NCA1 and the fourth area NCA2 overlap each other in the optical axis direction, thereby easily measuring concentricity of the lens.

Meanwhile, in the present exemplary embodiment, the outermost surface 25 of the lens may have a surface roughness corresponding to that of the second area NCA1 or the fourth area NCA2.

As set forth above, in the examples described herein, the lens and the lens assembly including the same are capable of preventing light reflection from occurring, and concentricity of the lens may be easily measured.

While exemplary embodiments have been shown and described above, it will be apparent to those skilled in the art that modifications and variations could be made without departing from the scope of the present invention as defined by the appended claims.

What is claimed is:

1. A lens, comprising:
an optical portion refracting light;
a rib extending along a circumference of at least a portion of the optical portion;
a first area and a second area of an object-side surface of the rib, wherein the first area comprises a first surface roughness and the second area comprises a second surface roughness less rough than the first surface roughness; and
a third area and a fourth area of an image-side surface of the rib, wherein the third area comprises a third surface roughness and the fourth area comprises a fourth surface roughness less rough than the third surface roughness,
wherein the second area comprises inclined surfaces,
wherein the inclined surfaces meet at a first edge portion, and
wherein the lens is made of plastic.

2. The lens of claim 1, wherein at least portions of the second area and the fourth area overlap each other when viewed in an optical axis direction.

3. The lens of claim 2, wherein the inclined surfaces comprise different angles of inclination from each other.

4. The lens of claim 1, wherein a second edge portion is formed in the fourth area.

5. The lens of claim 4, wherein the first edge portion and the second edge portion are disposed in a region in which the second area and the fourth area overlap each other when viewed in the optical axis direction.

6. The lens of claim 4, wherein a length between the first edge portion and an end of the rib is different from a length between the second edge portion and the end of the rib.

7. The lens of claim 1, wherein the first area and the second area are alternately formed from one side end of the rib to the other side end of the rib.

8. The lens of claim 7, wherein the first area is disposed on each of both sides of the second area.

9. The lens of claim 1, further comprising a first protrusion disposed in the first area protruding in the optical axis direction and a second protrusion disposed in the third area protruding opposite to the first protrusion in the optical axis direction.

10. The lens of claim 1, wherein an end of the rib comprises a surface roughness corresponding to that of the first area, the second area, the third area, or the fourth area.

11. A lens assembly, comprising:
lenses disposed along an optical axis and each of the lenses comprising an optical portion refracting light and a rib extending along a circumference of at least a portion of the optical portion; and
a lens barrel in which the lenses are accommodated,
wherein an object-side surface of the rib of at least one of the lenses comprises a first area and a second area having different surface roughnesses, wherein the first area is disposed to be closer to the optical portion than the second area and is rougher than the second area, and wherein the second area comprises inclined surfaces, wherein the inclined surfaces meet at a first edge portion, and wherein the at least one of the lenses is made of plastic.

12. The lens assembly of claim 11, wherein an image-side surface of the rib of the at least one lens comprises a third area and a fourth area comprising different surface roughnesses, and wherein the third area is disposed to be closer to the optical portion than the fourth area and is rougher than the fourth area.

13. The lens assembly of claim 12, wherein at least portions of the second area and the fourth area overlap each other when viewed in an optical axis direction.

14. The lens assembly of claim 13, wherein the fourth area comprises a second edge portion, and the first and second edge portions are disposed in a region in which the second area and the fourth area overlap each other in the optical axis direction.

15. The lens assembly of claim 11, wherein the ribs of two adjacent lenses are coupled to one another.

16. The lens assembly of claim 15, further comprising a spacer disposed between the ribs of the two adjacent lenses coupled to one another.

17. A lens, comprising:
an object-side surface and an image-side surface;
an optical portion comprising an optical axis; and
a rib extending along a circumference of the optical portion, the rib comprising a first circumferential region and a second circumferential region comprising lower surface roughness than the first circumferential region on the object-side and the image-side surfaces, wherein the second circumferential region overlaps on the object-side and the image-side surfaces in an optical axis direction in proportion to concentricity of the object-side surface and the image-side surface, wherein the second circumferential region comprises inclined surfaces, and the inclined surfaces meet at a circumferential edge portion, and wherein the lens is made of plastic.

18. The lens of claim 17, wherein the second circumferential region comprises the circumferential edge portion.

19. The lens of claim 17, wherein the second circumferential region comprises a first circumferential edge portion disposed on the object-side and a second circumferential edge portion disposed on the image-side, wherein the first circumferential edge portion is spaced apart from the second circumferential edge portion in a direction perpendicular to the optical axis direction in proportion to concentricity of the object-side surface and the image-side surface.

* * * * *